United States Patent [19]
Arii et al.

[11] Patent Number: 5,570,442
[45] Date of Patent: Oct. 29, 1996

[54] DESIGN AND MANUFACTURE OF AN OPTIMIZED WAVEGUIDE-TYPE MULTIPLE BRANCHED STAR COUPLER

[75] Inventors: Mitsuzo Arii; Kuniaki Jinnai; Hisashi Ohwada; Yasunari Kawabata, all of Tokyo, Japan

[73] Assignee: Mitsubishi Gas Chemical Company, Inc., Tokyo, Japan

[21] Appl. No.: 154,038

[22] Filed: Nov. 18, 1993

[30] Foreign Application Priority Data

Nov. 19, 1992 [JP] Japan ................................ 4-310335

[51] Int. Cl.$^6$ ........................................................ G02B 6/26
[52] U.S. Cl. .............................. 385/46; 385/49; 385/14; 385/43
[58] Field of Search .................................. 385/15, 24, 14, 385/45, 46, 48, 49, 43; 430/5, 321

[56] References Cited

U.S. PATENT DOCUMENTS 5,129,021  7/1992  Mortimore et al. ................ 385/46

FOREIGN PATENT DOCUMENTS

| 0428951A3 | 5/1991 | European Pat. Off. ......... G02B 6/28 |
| 56-140305 | 11/1981 | Japan . |
| 57-52004 | 3/1982 | Japan ..................................... 385/46 |
| 59-135417 | 8/1984 | Japan ..................................... 385/46 |

OTHER PUBLICATIONS

S. Ohshima et al., "Small Loss–Deviation Tapered Fiber Star Coupler for LAN," *Journal of Lightwave Technology*, vol. LT–3, No. 3 (Jun. 1985), pp. 556–559 (New York, USA).
Nippon Denki K.K., "Plane Type Light Distributing Circuit," Patent Abstracts of Japan, vol. 9, No. 137 (P–363) (1860), Jun. 12, 1985, Abstract No. 60–17706.
Kato et al., "New Fabrication Method of a Star Coupler by Staking Polymer," *Applied Optics*, vol. 27, No. 15 (Aug. 1, 1988) pp. 3177–3179 (New York, NY, USA).

*Primary Examiner*—John Ngo
*Attorney, Agent, or Firm*—Sterne, Kessler, Goldstein & Fox P.L.L.C.

[57] ABSTRACT

The present invention is an optical device including an optical circuit in which a plurality of branched optical waveguides are connected to a light receiving side and a light ejecting side of a main optical waveguide which mixes the entering light. The branched optical waveguides include a beginning and a terminal end. The terminal end is connected to an optical fiber and the beginning end is connected to the main optical waveguide. At least one of the branched optical waveguides has a slope or taper construction which is wider at the terminal end than at the beginning end, in order to improve lost variance and to reduce loss of light signals. The present invention also provides a method for manufacturing the above-described optical device to be used in optical local networks and optical instrumentation control systems.

20 Claims, 8 Drawing Sheets

DESIGN AND MANUFACTURE OF AN OPTIMIZED WAVEGUIDE-TYPE MULTIPLE BRANCHED STAR COUPLER

BACKGROUND OF THE INVENTION

1. Field of the Invention

The present invention relates to,an optical device and the method of manufacturing the optical device having optical waveguides which are used in, for example, local optical networks, and particularly relates to multi-mode type optical star couplers having optical waveguides (hereinafter referred to as "waveguide type multi-mode star coupler"). More particularly, the present invention relates to waveguide type multiple branched optical star couplers to be connected to graded index type multi-mode optical fibers, each fiber being 50 microns in core diameter and 125 microns in clad diameter, greatly improving the device's performance.

2. Description of the Prior Art

A multi-mode optical fiber has the advantage of high coupling efficiency with light sources, because of its large numerical aperture, compared to a single mode fiber, generally used in long distance communications. Another advantage of a multi-mode optical fiber because of its large core diameter is that the optical axes between different optical fibers or between the fiber and an optical device can be easily adjusted.

An example of a multi-mode optical fiber is a graded index type multi-mode optical fiber, 50 microns in core diameter and 125 microns in clad diameter (hereinafter referred to as the "50/125 GI optical fiber"). This type of multi-mode optical fiber is widely used, for example, in optical local networks and optical instrumentation control systems in the industrial field. It is expected that the 50/125 GI optical fibers will be further popularized and used more widely in the future because of the introduction of optical networks into offices and production sites, and because of the development of such optical networks.

An optical star coupler is an important optical device located in an optical network used to directly combine and distribute light signals. By using an optical star coupler, an optical network, the creation of an optical network used to combine and distribute light signals may be realized. Such an optical network is called a passive optical network, economically superior to an conventional active optical network, which requires the use of expensive converters to change light into electricity or electricity into light. In order to establish economically superior passive optical networks with star couplers, it is indispensable to enhance the performance of multiple branched optical star couplers, that is, multi-mode optical star couplers having many ports, frequently used in optical local networks, and to supply inexpensive products.

Manufacturing a waveguide type optical star coupler by connecting optical fibers to optical circuits (optical waveguides) for splitting and mixing light signals has two advantages: 1) multiple branched optical circuits can be easily obtained, because optical circuits are designed to have a high degree of freedom, compared to optical fiber fused type optical star couplers, which are manufactured by binding optical fibers by fusion; 2) multiple branched optical circuits are producible in large quantities.

The main performance indexes of optical star couplers are loss variance (distribution ratio) and optical loss.

Each piece of equipment or device connected to another piece of equipment or device through optical star couplers usually receives light signals at one of its receiving portions, transmitted from several other pieces of equipment or devices. Therefore, it is very important in designing the system that the receiving piece of equipment or device not be greatly affected by differences in the transmitting piece of equipment or device, and that the power of light signal received be approximately constant. In other words, light should be equally split regardless of which port the light enters the optical star coupler. If the loss variance of the optical star coupler greatly varied depending on the input ports, it would become necessary to expand the receiving sensitivity range of the receiving portion and to adjust the receiving sensitivity in accordance with the transmitter, and it would thus become difficult to design the system. As a result, the system itself would become expensive.

If the loss of the optical star coupler were small, the light receiving power of the receiving portion could be raised and the distance of the light signal transmission by optical fibers could be extended. As a result, it would become easier to design the system, and the system would be more economically efficient.

Especially, the most important issue for the future concerning the performance of multiple branched star couplers widely used in optical local networks is to improve the loss variance. The expression "multiple branched" means that the number of branches is, for example, 8 or more. An optical circuit of a waveguide type multi-mode optical star coupler is usually composed of a main optical waveguide and branched optical waveguides, which branch off respectively on the input side and on the output side of the main optical waveguide. The main optical waveguide functions to mix the mode of light signals entering the branched optical waveguides and to distribute the power of light signal to each branched optical waveguide on the output side through the main optical waveguide. Accordingly, the issue concerning the loss variance of the waveguide type multi-mode optical star coupler is to discover the optical circuit construction that enables effective mode mixing at the main optical waveguide and equal distribution of the mixed light.

A conventional method is described in, for example, Japanese Patent Laid-Open SHO No. 56-140305, which is to attain effective mode mixing through use of a the waveguide type multi-mode optical star coupler. According to this method, it is suggested that the width of the main optical waveguide be made wider at the center and narrower at its both ends, that is, to construct the main optical waveguide with a taper construction in order to heighten the mixing effect in the main optical waveguide.

Conventionally, a circuit with optical waveguides, each having a constant width, i.e., diameter, from the beginning side end (a joint portion with a main optical waveguide) to the terminal side end (a joint portion with an optical fiber), has been used as the branched optical waveguide of a waveguide type multi-mode optical star coupler. However, the problem with this type of optical device is that light cannot be distributed equally from the outside ports existing along the peripheries of the central portion of the device on the light receiving side, to the outside ports on the light ejecting side.

As described above, the greatest problem of the conventional waveguide type multiple branched multi-mode optical star couplers is inconstant loss variance. Therefore, it is indispensable to make some improvements by discovering an optical circuit construction which will not cause the above described light polarization.

The objective of the present invention is to provide optical devices which can effectively mix a plurality of entering light signals and can distribute light signals equally without polarization.

Another objective of the present invention is to provide optical devices for which loss of light signals is reduced.

A further objective of the present invention is to provide passive optical networks which are highly flexibile and economical.

Another objective of the present invention is to provide a method of manufacturing such optical devices.

SUMMARY OF THE INVENTION

As a result of examinations conducted in order to attain the above-mentioned objectives, the inventors of the present invention have succeeded in inventing optical devices for which the loss variance is much improved over that of the conventional devices, by obtaining an optical circuit construction with slopes (tapers) which are wider at the joint portion with the optical fiber (the terminal end) than at the joint portion with the main optical waveguide (the beginning end).

In order to attain the above-mentioned objectives, the present invention relates to an optical device including an optical circuit which mixes a plurality of entering light signals, distributes, and ejects the mixed light signals. This optical device includes an optical circuit in which a plurality of branched optical waveguides are connected to the light receiving side and the light ejecting side of a main optical waveguide (which mixes the entering light). Each of these branched optical waveguides has a slope which becomes wider at the terminal side end, which is to be connected to an optical fiber, than at the end of the side to be connected to the main optical waveguide.

Also, it is desirable that the above-mentioned optical circuit have the following characteristics.

$$X/Y \leq 0.8$$

$$40 \cdot Z \leq W$$

X: Width of the branched optical waveguide at its joint portion to the main optical waveguide (the beginning end).

Y: Width of the branched optical waveguide at its end on the terminal side (the terminal end).

W: Longitudinal length of the main optical waveguide.

Z: Cross directional length of the main optical waveguide.

It would be even more desirable that the above-mentioned optical circuit also have the following characteristics:

$$0.4 \leq X/Y$$

$$W < 60 \text{ (mm)}$$

At least one of the branched optical waveguides includes bends in order to connect to both the optical fiber and the main optical waveguide. The degree of bend becomes larger as the position of the branched optical waveguides moves toward the outside from the middle of the lateral side of the main optical waveguide. Furthermore, the bend either includes the necessary minimum number of points of inflection, or its curvature is adjusted, or both of the above are attempted so that the branched optical waveguide may be connected to the main optical waveguide as it curves.

The terminal end of the branched optical waveguide to be connected to an optical fiber is formed so as to have a width corresponding to 70% to 100% of the core diameter of the outside optical fiber which is connected to the terminal end.

The radius of curvature of the above-mentioned bend is set at the point from which the bend loss starts to radically increase, as can be seen in the relationship of bend loss and radius of curvature.

The above characteristics are adjusted for each branched optical waveguide in order to correct the differences in loss due to the length of the branched optical waveguide.

The branched optical waveguide includes two circular arc shaped optical transmission paths of which radii are almost the same in length, of which the centers are located in opposite positions, and which are connected to each other.

The main optical waveguide and the branched optical waveguides are formed so as to have a larger numerical aperture than those of the outside optical fibers, which are connected to the terminal ends of the branched optical waveguides.

The optical network of this invention includes the above-mentioned optical device and optical fibers connected to the branched optical waveguides of the optical device.

The present invention includes a method of manufacturing the optical circuit, having the steps of selectively irradiating light on a base material containing light reactive monomers, and forming an optical circuit in which a plurality of branched optical waveguides are connected respectively to the light receiving side and the light ejecting side of a main optical waveguide, which mixes the incident light.

The above-mentioned base material contains polycarbonate, and the above-mentioned monomers contain at least either of the following: acrylic acid, acrylate.

In the present invention, when light with a luminous intensity of $I_0$ enters the optical star coupler from one port (port no. "m" on the light receiving side), and is distributed to ports on the opposite side, i.e., the light ejecting side, the total number of such ports being "n," with a luminous intensity $I_n$, the insertion loss $ILm_n$ at each ejecting port is defined by the following formula (1):

$$ILm_n \ (dB) = 10 \log \tag{1}$$

Furthermore, the difference between the maximum value and the minimum value of the insertion loss $ILm_n$ is defined as the loss variance (branching ratio) of each port when the light enters the optical device from port no. "m," and the loss variance of the entire optical star coupler having N ports on the light receiving side and N ports on the light ejecting side (hereinafter referred to as "N×N") is defined as a difference between the maximum value and the minimum value of the insertion loss of ports N×N.

The excess loss ELm of each port when the light enters the Optical device from the port number "m" is defined by the following formula (2):

$$ELm \ (dB) = 10 \log (I_o / \Sigma I_n) \tag{2}$$

The excess loss of the entire N×N optical star coupler is defined as the arithmetic mean of the excess loss of each port when the total number of ports is "n."

Therefore, it is necessary to reduce such losses in order to improve, i.e., to reduce, the loss variance.

Loss at the waveguide type optical star coupler will be explained hereinafter. The above-mentioned insertion loss and excess loss occur due to the loss described below.

In the process of the propagation of light within an optical waveguide, transmission loss occurs due to the absorption or scattering of light. Transmission loss is determined according to the materials or manufacturing methods of the optical waveguide, and is substantially proportional to the length of the optical waveguide. Accordingly, it is necessary to shorten the dimensions of the optical circuit as much as possible in order to reduce transmission loss.

In general, when an optical waveguide having a substantially rectangular cross section is connected to an optical fiber having a circular cross section, coupling loss (shape loss) occurs at the joint point due to the difference in the shape. In order to reduce shape loss, it is necessary to optimize the dimensions of the width of the terminal end of the branched optical waveguide (to be connected to the optical fiber), the thickness of the optical circuit, and the core diameter of the optical fiber. As can be predicted by calculation, shape loss may be reduced to a minimum by setting the width of the terminal end, the thickness of the optical circuit, as 70% to 100%, or optimally about 80%, of the core diameter of the optical fiber.

Furthermore, when the optical waveguide is connected to the optical fiber, another loss occurs due to the difference in the numerical aperture between the optical waveguide and the optical fiber. The numerical aperture (NA) is represented by a core refractive index (nco) and a clad refractive index (ncl) as in the following formula (3).

$$NA=(nco^2-ncl^2)^{1/2} \quad (3)$$

When the numerical aperture of the optical waveguide (NAwg) is too small compared to the numerical aperture of the optical fiber (NAf), a loss occurs as the light enters the optical waveguide from the optical fiber. Therefore, the optical waveguide needs to be made so as to have a larger numerical aperture than that of the optical fiber. For example, in a case of the optical waveguide formed with a base material of polycarbonate, the core refractive index (nco) is 1.59, and the numerical aperture of a 50/125 GI optical fiber (NAf) is 0.2. Thus, the optical waveguide may be manufactured to have a clad refractive index (ncl$^2$) which will satisfy the following formula (4).

$$(1.59^2-ncl^2)^{1/2} > 0.2 \quad (4)$$

Specifically, the loss due to the difference in the numerical aperture between the optical waveguide and the optical fiber may be diminished completely if the optical waveguide is manufactured to have an ncl<1.58.

Furthermore, an optical waveguide which has a bend portion suffers a loss due to bend. Reduction of the loss due to bend is a very important issue for waveguide type optical star couplers, especially for multiple branched optical star couplers. The reason is that in the multiple branched optical star coupler, the degree of bend becomes larger as the position of branched optical waveguides moves toward the outside of the central axis of the main optical waveguide.

Figure 1A:
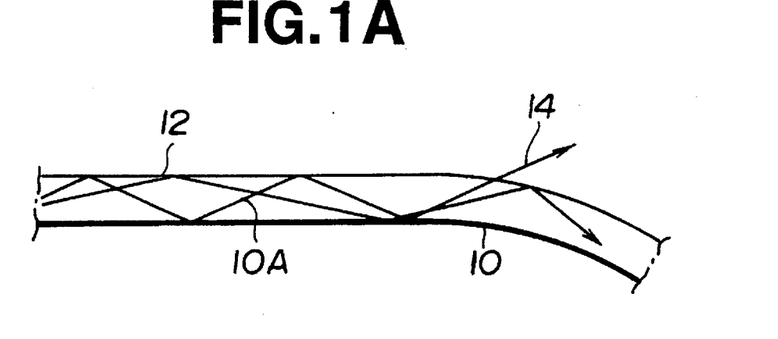
FIGS. 1A, 1B and 1C are typical diagrams showing the occurence of loss in a bend optical waveguide.
Figure 1B:
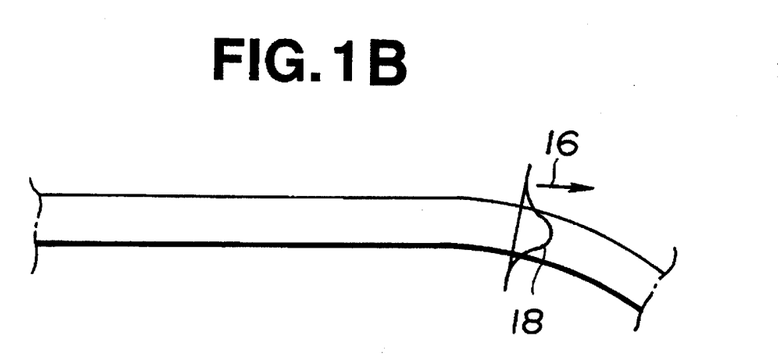

The loss at the bend portion is explained in more detail hereinafter. When the light 10A transmitting through an optical waveguide enters the bend portion 10 from the straight portion 12, a loss, i.e., leakage of light, occurs due to the difference in guided modes (FIG. 1A). Specifically, after part of the light enters the bend portion, the mode of the light increases, the light becomes a ray having a numerical aperture exceeding that of the optical waveguide, and as a result, the light leaks. Moreover, there is further loss of light 16 from leakage out of the curved optical waveguide due to irradiation, which is based on electric field distribution 18 (FIG. 1B). Both the loss caused by the difference in guided modes and the loss caused by irradiation becomes greater as the curvature of the bend portion becomes larger, that is, as the bend becomes steeper.

Figure 1C:
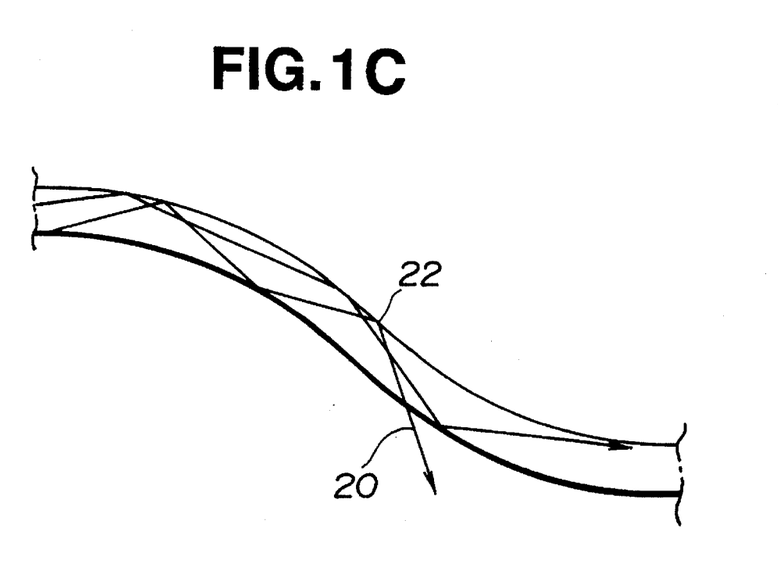

Furthermore, although the loss due to the difference in guided modes is not affected by the central angle of the bend portion, the loss 20 increases as the direction of bend, in other words, the location of the point of inflection 22 changes (FIG. 1C). On the other hand, the loss 16 due to irradiation increases in proportion to the central angle of the bend portion.

Figure 2A:
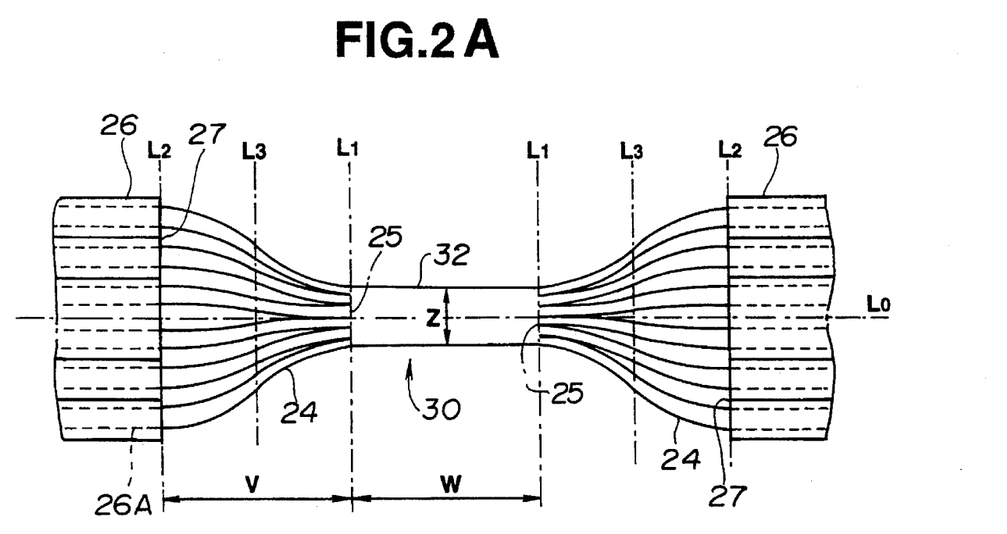
FIG. 2A is a typical plan view of a tapered optical star circuit of the polymer waveguide type optical star coupler of the present invention.

Therefore, in order to reduce the loss due to bend of the waveguide type optical star coupler, it is necessary to decrease the curvature of the bend portion of the branched optical waveguide 24, that is, to have a larger radius of curvature (shown as $R_1$, $R_2$ . . . $R_n$ of FIG. 2B) of the waveguide type optical star coupler. However, as shown in FIG. 2A, the space between the branched optical waveguides 24 at their terminal ends cannot be shorter than the clad diameter in order to be connected with optical fibers 26. Therefore, the length of the branched optical waveguides, indicated as V of FIG. 2A, needs to be longer in order to enlarge the radius of curvature. In this case, as described above, the problem is that the transmission loss sometimes increases. Numeral 26A indicates a core of the optical fiber 26.

Regarding a curved optical waveguide with a constant width, the relationship between the loss due to bend (LR) and the radius of curvature (R) may be obtained by using a parameter (q) of the curved optical waveguide, applying the geometric ray tracing technique, as described in the following formulas:

(a) q<1

$$LR=-10\times\log (2q/3) \quad (5)$$

(b) q>1

$$LR=-10\times\log \{2/3 [1+(q-1)/[q+(q^2-q)^{1/2}]]\} \quad (6)$$

The parameter (q) of the curved optical waveguide may be represented by the following formula (7) with the radius of curvature (R), width of the optical waveguide (d), core refractive index of the optical waveguide (n), and difference between the refractive indexes of the core and clad ($\Delta$n):

$$q=R\cdot\Delta n/(d\cdot n) \quad (7)$$

Figure 2B:
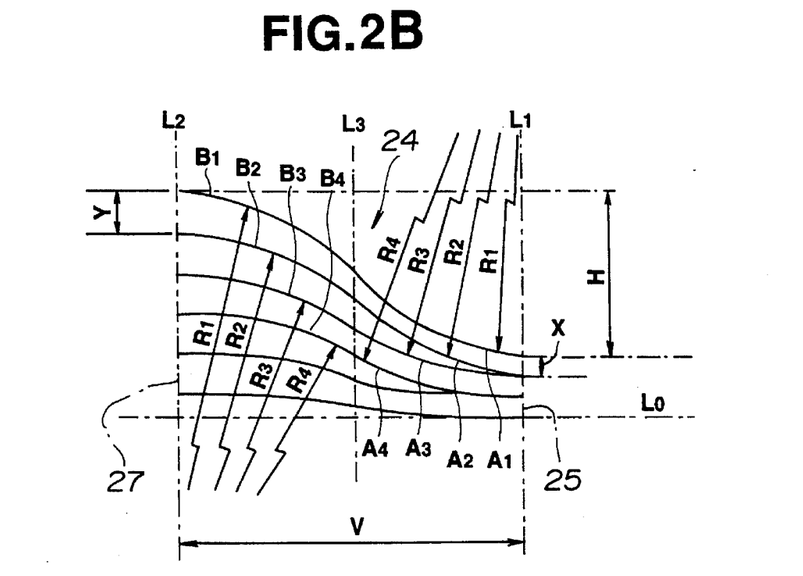
FIG. 2B is a detailed plan of a tapered branched optical waveguide.

The radius of curvature (R) may be calculated by the following formula (8), based on the value representing the difference in positions between the beginning end and the terminal end (H) and the length (V) of the optical waveguide as shown in FIG. 2B:

$$R=(H^2+V^2)/(4\times H) \quad (8)$$

The width of the curved optical waveguide (d), the core refractive index (n) of the optical waveguide, and the difference between the refractive indexes of the core and clad ($\Delta$n) are determined as variables independent of the radius of curvature (R) if the aforesaid shape loss and loss due to the difference in the numerical aperture are minimized. Accordingly, we may consider the relationship between the loss due to bend (LR) and the parameter (q) determined by the above formulas (5), (6), (7) and (8), as equivalent to the relationship between the loss due to bend (LR) and the radius of curvature (R).

Figure 3:
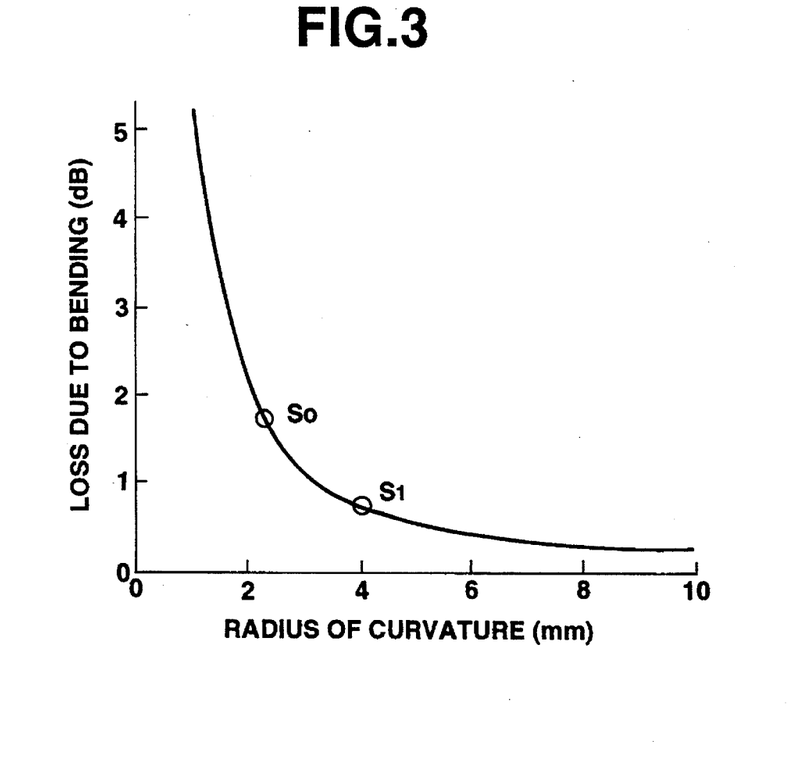
FIG. 3 is a diagram showing the relationship between loss due to bend and the raidus of curvature.

FIG. 3 illustrates the relation between the loss due to bend (LR) and the radius of curvature (R) determined by the above formulas (5), (6), (7) and (8), when the width of the optical waveguide (d) is 28 μm, the core refractive index (n) is 1.59, and the difference between the refractive indexes of the core and clad (Δn) is 0.02, that is, when the numerical aperture of the optical waveguide ($NA_{wg}$), as calculated by the formula (3), is 0.25. In FIG. 3, the point $S_0$ is the boundary point of the above formulas (5) and (6).

In general, as shown on the right of point $S_1$ of FIG. 3, there is an area in which the loss due to bend (LR) is not greatly affected by changes in the radius of curvature (R). However, setting the radius of curvature (R) as larger than is required only causes transmission loss as described above. Therefore, the radius of curvature (R) should be set within an appropriate range, considering loss due to bend (LR) and transmission loss. Specifically, there will be no problem if the radius of curvature (R) is set at the above-mentioned point $S_1$, from which the loss due to bend (LR) begins to increase radically.

The optical device of the present invention may be manufactured well by using the selective photopolymerization method, as explained below.

An optical circuit is formed by selectively irradiating the light through a photomask (onto which a pattern corresponding to the optical circuit has been previously made) onto a polymer film in which light reactive monomers have been previously impregnated, thereby selectively polymerizing the monomers.

Since this selective photopolymerization method easily produces high performance optical circuits, waveguide type optical devices (multi-mode star couplers) may be manufactured at a low cost.

Moreover, by utilizing the optical circuits including optical waveguides formed by the selective photopolymerization method, high performance and inexpensive waveguide type multiple branched optical star couplers, to be used for 50/125 GI optical fibers, may be supplied to the market. Hence, constructing highly flexible and economical passive optical networks has become easier.

DETAILED DESCRIPTION OF THE PREFERRED EMBODIMENTS

Figure 4:
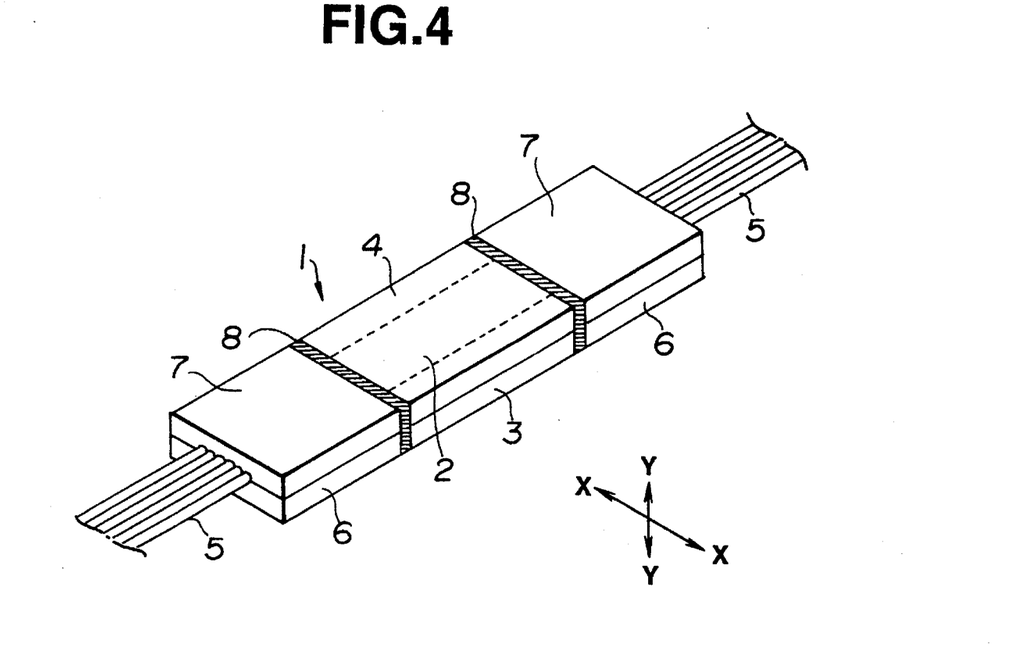
FIG. 4 is a perspective diagram of a typical polymer waveguide type optical star coupler of the present invention.

AS shown in FIG. 4, an optical star coupler 1 is constructed by connecting an optical circuit plate 4 to optical fiber arrays 7 with an adhesive 8. This optical plate 4 is provided with a polymer film 2 on which the optical circuit is formed, and with substrates 3 which reinforce the polymer film. Each of the optical fiber arrays 7 is provided with substrates 6 and 50/125 GI optical fibers 5 which are arrayed between the substrates 6. The optical circuit of the polymer film 2 is formed by selectively polymerizing light reactive monomers which are impregnated in the transparent high polymer film.

As shown in FIGS. 2A and 2B, the optical circuit 30 has a main optical waveguide 32 with an uniform width, and both ends of the main optical waveguide 32 are separated into a plurality of branched optical waveguides 24. The optical circuit 30 is symmetrical at the center line L0, and has uniform thickness and a uniform refractive index on the whole. The branched optical waveguides 24 are arrayed in close contact with each other at their beginning ends 25 on line $L_1$, connected to the main optical waveguide 32, and to optical fibers 26 at their respective terminal ends 27 on line $L_2$. Moreover, all the beginning or terminal ends of the branched optical waveguides are arrayed along the straight lines $L_1$ or $L_2$ which are perpendicular to the center line $L_0$. Line $L_3$ is the line positioned in the middle of the lines $L_1$ and $L_2$.

The characteristic of the above-described device is that the loss variance of the multiple branched optical star coupler is greatly improved by forming the branched optical waveguides 24 in a sloped or tapered shape in order to make the width of the branched optical waveguide 24 wider at its terminal end 27 than at its beginning end 25. In particular, it is desirable that the multiple branched waveguide type optical device be constructed such that the main optical waveguide and the branched optical waveguides will satisfy the following relational expressions when the width of the beginning end of the branched optical waveguide is represented as X, the width of the terminal end of the branched optical waveguide is represented as Y, the length of the main optical waveguide is represented as W mm, and the width of the main optical waveguide is represented as Z mm. X, Y, W, and Z are indicated in FIG. 2B.

$$0.4 \leq X/Y < 0.8 \tag{9}$$

$$40 \times Z \text{ mm} \leq W < 60 \text{ mm} \tag{10}$$

Figure 5A:
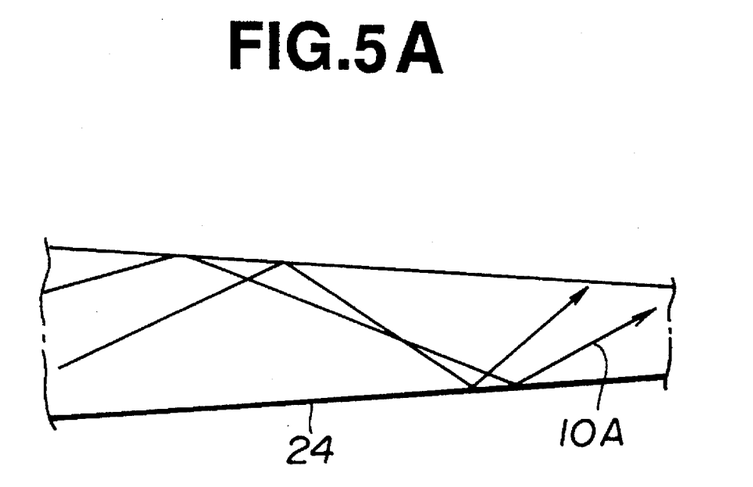
FIGS. 5A and 5B are typical diagrams showing the effects of a taper.
Figure 5B:
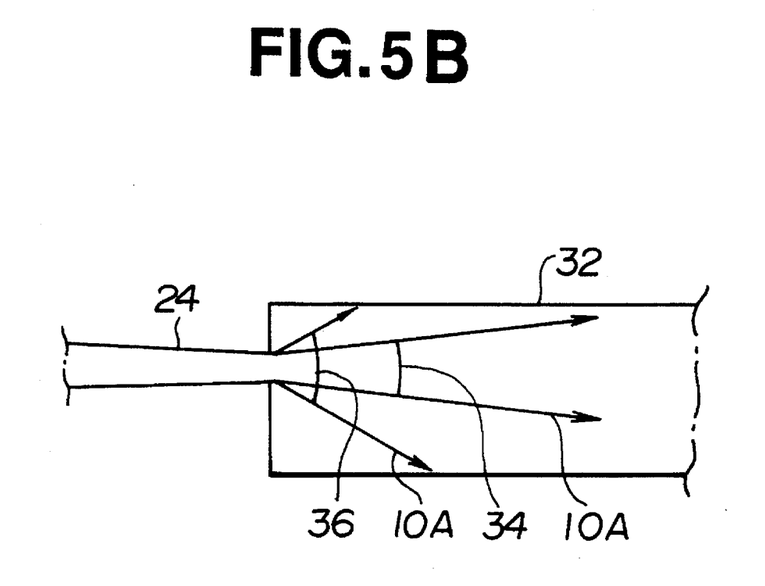

By forming the branched optical waveguide 24 in a tapered shape, the numerical aperture (NA) of the transmitted light 10A within the branched optical waveguide may increase from a small numerical aperture 32 to a large numerical aperture 34, and the angle of incidence of the light entering the main optical waveguide may be enlarged as shown in FIG. 5A and 5B. In this way, the formation of the branched optical waveguide 24 in a tapered shape enables effective mixing within the main optical waveguide 32 because of the reflection of the light, and the light may be more equally distributed to the branched optical waveguides on the opposite side, i.e., the light ejecting side.

On the other hand, by making the branched optical waveguide in a tapered shape, a problem can occur in that propagation loss within the branched optical waveguide increases. Therefore, it is desirable to optimize the ratio (X/Y) (hereinafter referred to as "taper ratio") of the width of the beginning end (X) to the width of the terminal end (Y) of the branched optical waveguide.

When the light propagates within the optical waveguide formed in a tapered shape, loss at the optical waveguide (LS) may be represented by the following formulas, based on the ray tracing method, with the numerical aperture of the optical waveguide being NAwg, the numerical aperture of the incident light being NAin, and the taper ratio being T.

(a) When $T \leq (NAin/NAwg)$ $$LS = 0 \, dB \quad (11)$$

(b) When $T < (NAin/NAwg)$ $$LS = -10 \times \log \{NAwg/(NAin/T)\} dB \quad (12)$$

NAin is considered to be equal to the numerical aperture of the optical fiber (NAf) that is used. The NAf of the 50/125 GI optical fiber is 0.2.

As described above, the optical waveguide is manufactured so as to have a numerical aperture (NAwg) larger than that of the optical fiber (NAf), NAwg>NAf, in order to reduce coupling loss at the joint point of the optical waveguide and the optical fiber. Namely, in the above formulas, the ratio of NAin to NAwg is less than 1: (NAin/NAwg)<1, and the taper ratio is $T \leq 1$, in accordance with the definition.

There is a limit to the numerical aperture of the optical waveguides manufactured by the selective photopolymerization method due to some reason related to the manufacturing process. Therefore, when the degree of the taper becomes larger, that is, when the taper ratio becomes too small, the loss at the optical waveguide (LS) is subject to the above formula (12), and loss increases.

Accordingly, in order to reduce the loss variance without increasing excess loss of the waveguide type optical star coupler, it is desirable to set the taper ratio, i.e., the ratio (X/Y) of the beginning end width (X) to the terminal end width (Y) of the branched optical waveguide, within an appropriate range.

Figure 6A:
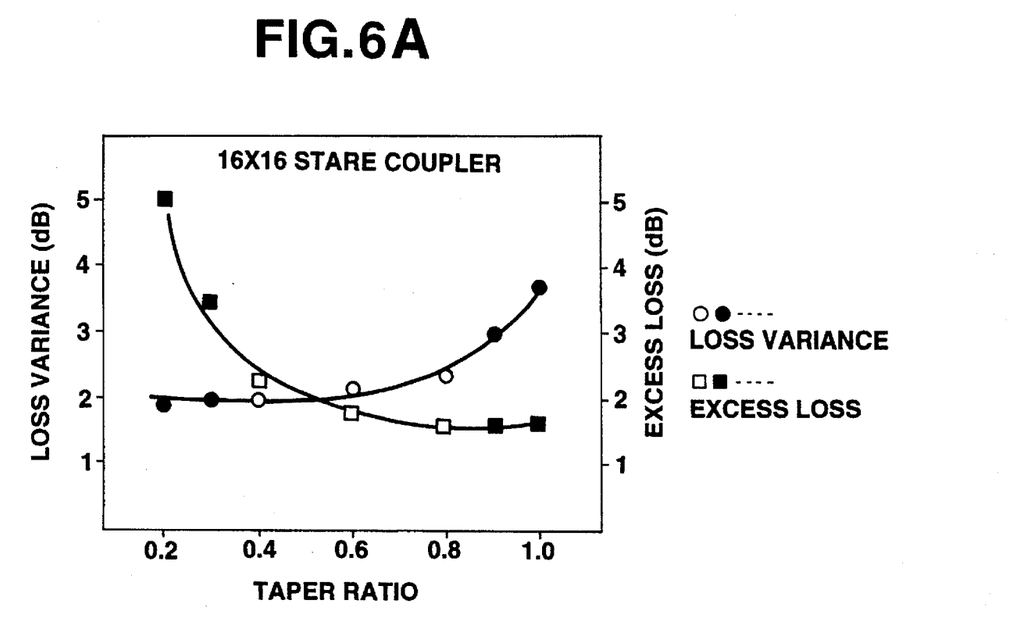
FIGS. 6A and 6B are diagrams showing the relation between the taper ratio of the branched optical waveguide, the loss variance, and excess loss.
Figure 6B:
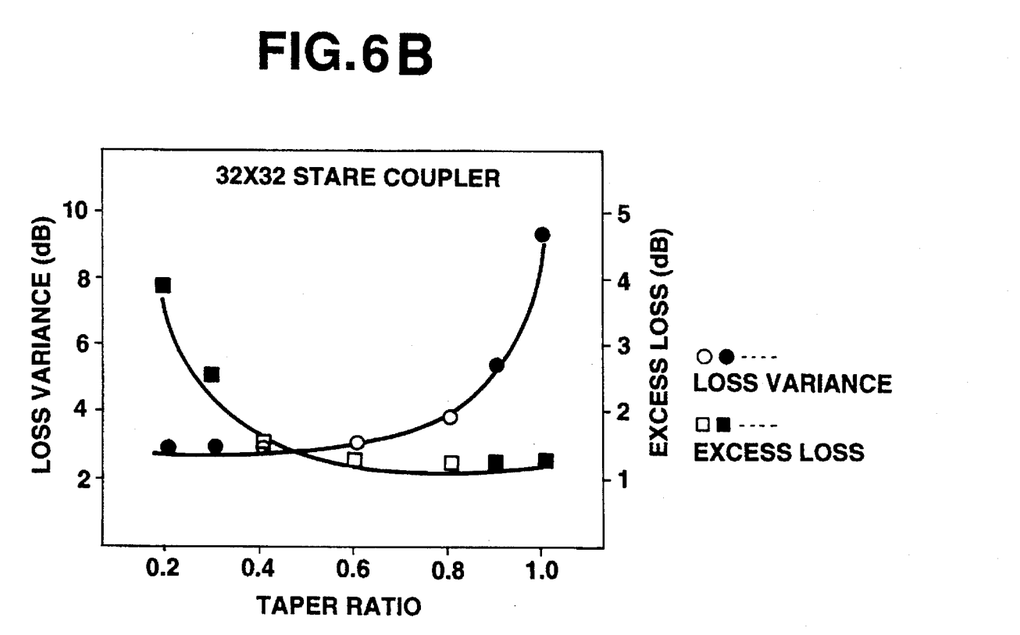

The inventors of the present invention conducted the following experiment with regard to 16×16 and 32×32 optical star couplers for the 50/125 GI optical fibers. Specifically, for the optical circuit of the optical star coupler, by setting the width of the terminal end of the branched optical waveguide as 40 microns, the length of the branched optical waveguide (V) as 12 mm, and the ratio (W/Z) of length (W) to width (Z) of the main optical waveguide as a constant of 40, and by changing the ratio (X/Y) of the beginning end width (X) to the terminal end width (Y) of the branched optical waveguide, the inventors were able to thoroughly examine the relation between X/Y, loss variance, and light loss (excess loss). The results are shown in FIGS. 6A and 6B. We can see from these results that, in either optical coupler, loss variance may be remarkably improved (reduced) by forming a taper with a taper ratio of about 20% (X/Y=0.8). When the taper ratio is 0.8 or less, loss variance was almost constant.

On the other hand, excess loss gradually increased as the taper ratio became less than 0.4. This result is due mainly to the increase of loss caused by forming the branched optical waveguide in a tapered shape. Namely, in this case, the width of the terminal end (Y) of the branched optical waveguide does not change and the shape loss indicates a constant value. Moreover, since the width of the terminal end (Y) and the ratio (W/Z) of length (W) to width (Z) of the main optical waveguide are constant, the length of the main optical waveguide (W) becomes shorter as the taper ratio becomes smaller. In this case, transmission loss of the main optical waveguide also decreases. As another cause, the radius of curvature of the branched optical waveguide increases along with the decrease of the taper ratio, and as a result, bend loss also decreases. Therefore, the increase of excess loss when the taper ratio is less than 0.4 may be caused by forming the branched optical waveguide in a tapered shape.

As described above, the lower limit of the taper ratio may be determined by controlling excess loss, and loss variance may be improved by setting the taper ratio as $X/Y \leq 0.8$. Moreover, by setting the taper ratio as $0.4 \leq X/Y \leq 0.8$ as in formula (9), loss variance may be greatly improved without increasing excess loss.

However, when the branched optical waveguide is formed in a tapered shape, it is desirable to set the length of the main optical waveguide in order to achieve effective mixing in the main optical waveguide. It is well understood that such a required length correlates with the width of the main optical waveguide.

Figure 7A:
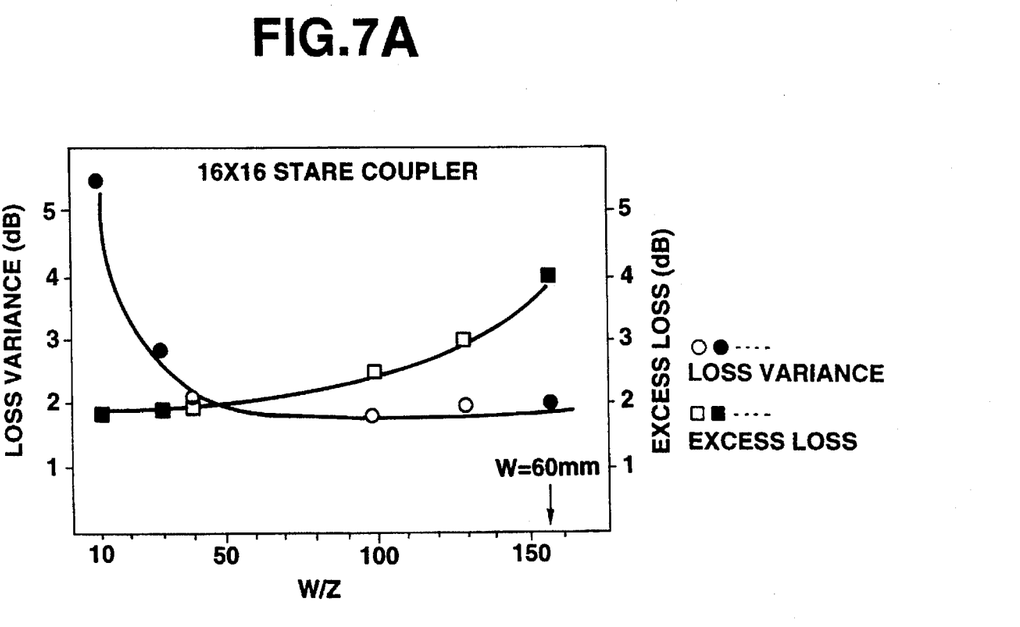
FIGS. 7A and 7B are diagrams showing the relationship between the ratio of length to width of the main optical waveguide, the loss variance, and excess loss.
Figure 7B:
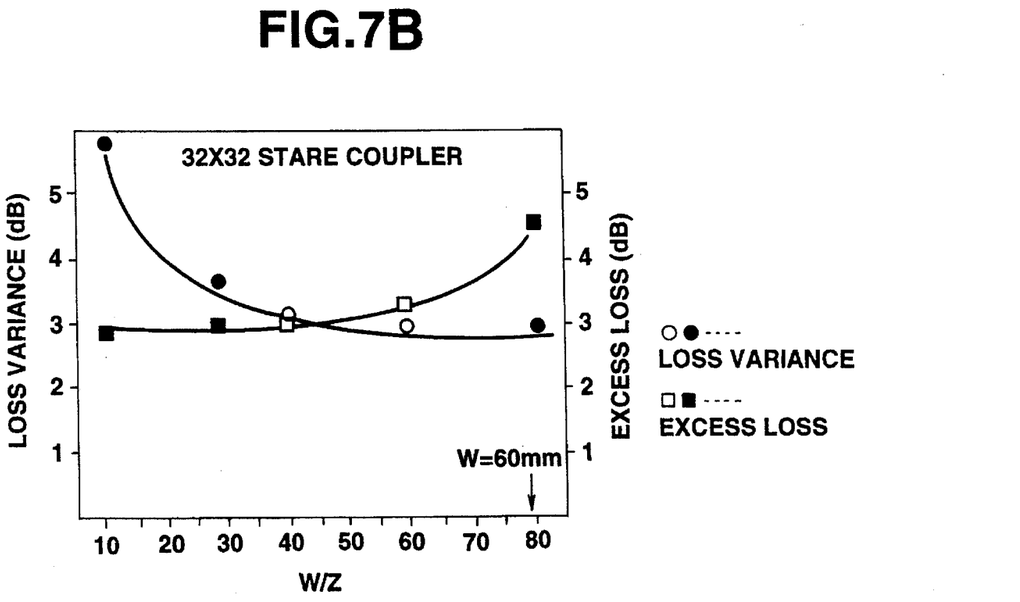

The inventors of the present invention also conducted the following experiment concerning 16×16 and 32×32 optical star couplers for the 50/125 GI optical fibers. For the optical circuit of the optical star coupler, the length of the branched optical waveguide (V) was made constant and the taper ratio was set as 0.6. Then, the inventors thoroughly examined the relation between W/Z, the ratio of length (W) to width (Z) of the main optical waveguide, loss variance, and excess loss. The results are shown in FIG. 7A and 7B. In this case, since the width of the terminal end of the branched optical waveguide (Y) is as constant as 40 microns, the taper ratio (T) and the width of the main optical waveguide (Z) (number of branches (N)×width of the beginning end (X)) are constant. Therefore, FIG. 7A and 7B show the relation between the length of the main optical waveguide (W), loss variance, and excess loss.

Loss variance becomes fairly constant when W/Z is 40 or more, namely, when the length of the main optical waveguide (W) is 40×Z or more, and loss variance gradually becomes larger when W/Z is less than 40.

It is desirable for the length of the main optical waveguide (W) to be shorter in order to control and reduce excess loss. In the case of a polymer optical waveguide which is formed by the selective photopolymerization method used in the present invention, transmission loss is within the range of 0.15 dB/cm to 0.2 dB/cm. Accordingly, when the length of the main optical waveguide is 60 mm or longer, great loss occurs, if the transmission loss alone of the main optical waveguide exceeds 1 dB. According to the results of FIG. 7A and 7B, excess loss may be controlled and reduced by setting the length of the main optical waveguide as shorter than 60 mm.

When the length of the main optical waveguide (W) is $40 \cdot Z \, (mm) \leq W$, there is less loss variance, which is good. Moreover, when W satisfies the above formula (10) which is $40 \cdot Z \, (mm) \leq W < 60 \, (mm)$, loss variance and excess loss of the optical star coupler are both good.

As stated above, multiple branched optical star couplers superior in loss variance and excess loss may be manufactured at a high yield by setting the dimensions of the optical circuit to satisfy the above formulas (9) and (10).

As shown in FIG. 1, the mode of the light increases within the tapered branched optical waveguides 3 on the light receiving side, is mixed in the main optical waveguide 2, and is distributed to the branched optical waveguides 3 on the light ejecting side. Then, opposite to the light receiving process, the mode of the light decreases in the process of light propagation through the branched optical waveguides 3 on the light ejecting side after light mixing in the main optical waveguide. Therefore, in the process of light propagation through the branched optical waveguides on the light ejecting side, no loss occurs due to the difference in the numerical aperture of the propagating light and the optical waveguides, like loss occurs in the light entering process.

As for an N×N optical star coupler, branched optical waveguides are constructed to have completely symmetrical taper ratios on the light receiving side and on the light ejecting side. In the case of an N×M star coupler, since it is usually possible to design branched optical waveguides to have almost symmetrical taper ratios on the light receiving side and on the light ejecting side, the light that finally ejects from the branched optical waveguides toward optical fibers have a numerical aperture which is not so different from that of the entering light, in other words, which is almost equal to that of optical fibers. Hence, coupling loss does not increase due to the difference in the numerical aperture of the ejecting light and the optical fibers.

As an example of the method of forming the branched optical waveguide of the present invention in a tapered shape, a circumference of each core or clad which forms a bend portion of the branched optical waveguide is made by connecting two circular arcs with identical radii, and two circumferences which form one branched optical waveguide are constructed by setting the radii of the circular arcs apart from each other. In this way, the branched optical waveguide may be easily formed in a tapered shape.

The method of forming the branched optical waveguide of the present invention in a tapered shape can be explained more specifically and in more detail by referring to FIG. 2B, which illustrates the optical circuit of the present invention. The circumference of the bend portion of the branched optical waveguide may be formed by connecting two circular arcs (for example, circular arcs $A_1$ and $B_1$, or $A_2$ and $B_2$) with the same radii ($R_n$), the center positions of which are opposite to each other with the circumference in between. The branched optical waveguide may be formed in a tapered shape which becomes continuously wider from the beginning end to the terminal end by designing and manufacturing the optical waveguide such that the centers of the circular arc group A ($A_1, A_2, \ldots A_n$) are on the straight line L1 and the centers of the circular arc group B ($B_1, B_2, \ldots B_n$) are on the straight line $L_2$, and by making the radii of the respective circular arcs of the circular arc groups have the relation $R_1 < R_2 < \ldots < R_n$. The connecting points of the respective circular arcs, i.e., points of inflection of the circumferences, are arrayed one by one on the straight line $L_3$, located in the middle of straight lines $L_1$ and $L_2$. Therefore, as long as the number of points of inflection is kept small in number. loss due to bend, caused by increasing the mode of light, may be reduced.

The means of designing the circumferences of cores and clads of the branched optical waveguides is not limited to the above-mentioned method, as other methods or means, such as approximation by utilization of multiple dimension curves, are applicable. It is desirable to have as few points of inflection in the branched optical waveguide as possible in order to reduce loss due to bend.

The width of the beginning end (X), the width of the terminal end (Y), and the ratio of the beginning end width to the terminal end width (X/Y) of the respective branched optical waveguides may be either identical to or different from each other. The important point is to have X/Y within the range satisfying the above conditions. In the case of an optical star coupler with multiple branches, the length of the branched optical waveguides in the central part differs from those on the outer side. Therefore, even if the bias in distribution of light power in the optical device is improved, some bad loss variance is a possible result because of differences in transmission loss due to differences in the lengths of each optical waveguide. An effective means of correcting the above problem is to change the ratio X/Y or the width of the terminal end Y of each of the branched optical waveguides.

The space between the terminal ends of the branched optical waveguides may be chosen within a certain range that will not worsen loss variance or excess loss. For example, as shown in FIG. 2A, each space between the terminal ends of the branched optical waveguides may be the same, and may be almost equal to the outer diameter, i.e., the clad diameter, of an optical fiber, resulting in the advantage that an optical fiber array formed by previously arraying optical fibers in close contact with each other, can thus be easily connected to the optical waveguides as a lump. In this case, as the number of design parameters of the optical circuit decreases, designing the circuit becomes easier and manufacturing costs decrease.

Figure 8A:
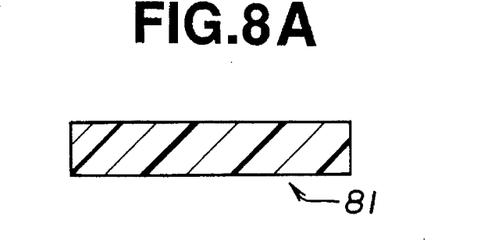
FIGS. 8A, 8B, 8C and 8D are a diagram showing the method of manufacturing the polymer optical waveguide by the selective photopolymerization method.
Figure 8B:
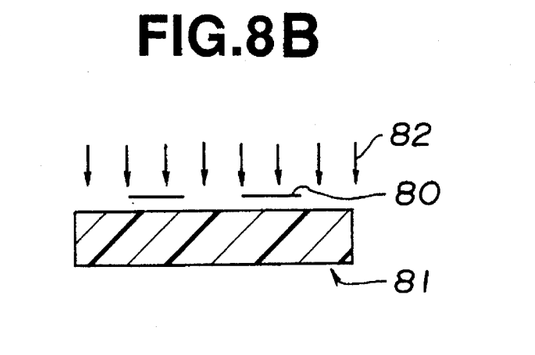
Figure 8C:
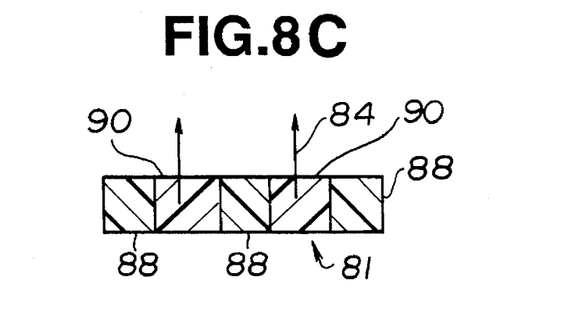

A method of manufacturing the optical circuit used in the waveguide type optical device of the present invention is explained hereinafter, referring to FIGS. 8A, 8B, 8C and 8D. The first step of manufacturing the optical circuit consists of manufacturing a high transparent polymer film 81 containing a predetermined amount of light reactive monomers and sensitizers, as shown in FIG. 8A; the second step consists of placing a photomask 80 over the above film, irradiating the ultraviolet light 82 on the film, and polymerizing the light reactive monomers of the portion exposed to the light, as shown in FIG. 8B; the third step consists of removing the monomers 84 which did not react to the light, by applying suction drying to the film, as shown in FIG. 8C; and the fourth step consists of forming clad phases 86 to protect surfaces of the optical waveguide on both the front and back surfaces of the film. An adhesive, which glues substrates in order to reinforce the optical circuit film, may also be used as the clad phases on both surfaces of the film, as shown in FIG. 8D.

Figure 8D:
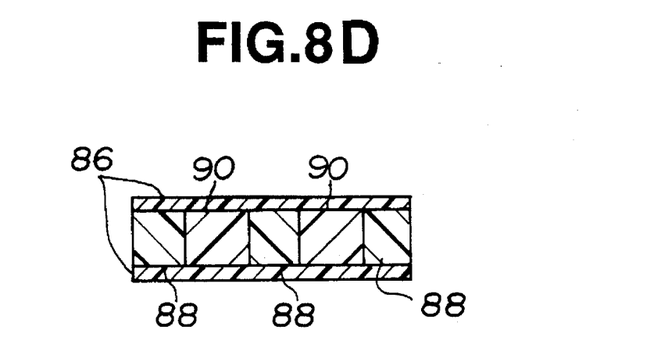

FIGS. 8C and 8D illustrate that the portion 88 exposed to the light becomes the clad phase and the portion 90 not exposed to the light becomes the core phase. However, it is possible to select a combination of matrix polymers and monomers which will make the portion exposed to the light the core phase, and the portion not exposed to the light the clad phase. Such a combination may be optionally selected according to the refractive indexes of matrix polymers and monomers.

Polycarbonate made from bisfhenol is an appropriate material as a matrix polymer because it has good transparency and high mechanical strength. Since the refractive index of the matrix polymer can be as high as 1.59, acrylic acid and acrylate are preferable as light reactive monomers, because they generally have lower refractive indexes than the matrix polymer and their boiling points are comparatively low. Examples of such monomers are methyl acrylate, ethyl acrylate, acrylic acid, and trifluoloethyl acrylate.

A more detailed explanation of the present invention is made hereinafter. However, the following examples are indicated only in order to explain the present invention more specifically, and are not intended to limit the embodiments or the scope of the present invention.

EXAMPLES 1, 2 AND 3

A quartz photomask, on which an optical circuit pattern was formed with the dimensions shown in Chart 1, was manufactured in order to be used for producing a 16×16 optical star coupler having a rectangular cross section to be connected to GI optical fibers (numerical aperture: 0.2), each of which was 50 μm in core diameter and 125 μm in clad diameter. The dimensions of the mask were designed to compensate for approximately 4% shrinkage in the dimensions when the optical circuit is manufactured. The mask was designed to have a 125 μm space between the terminal ends of the branched optical waveguides so that the optical fibers would be arrayed in close contact with each other. A circumference of each core or clad of the branched optical waveguides was formed by connecting circular arcs with the same radii. The radius of curvature for each circumference was designed based on the relational expression $R=(H^2+V^2)/4H$ (the above formula (8)) (H: difference in positions between the beginning end and the terminal end of the branched optical waveguide, V: length of the branched optical waveguide).

The aforesaid selective photopolymerization method was applied to form the optical circuit. Namely, a film (thickness: 42 μm), containing polycarbonate resin synthesized from bisfhenol Z (made by MITSUBISHI GAS CHEMICAL CO., INC., product name: Iupilon Z), trifluoloethyl acrylate as a monomer with a low refractive index, and benzoin ethyl ether as a sensitizer, was manufactured by a solvent casting method. After polymerizing the monomers in the portions, excluding the circuit, by exposing the film to ultraviolet rays by using the above-mentioned photomask, the monomers at the circuit portion, which did not react to the ultraviolet rays, were dried by a suction drying method, and were removed, thereby forming the optical circuit in the film. The thickness of the film after drying was 40 μm, and the numerical aperture of the optical circuit was 0.3.

The ratio of the numerical aperture of the optical fiber to those of the optical circuit was 0.67. The ratio of the thickness of the optical circuit (the longitudinal length in the directions, indicated as X—X in FIG. 4) to the core diameter of the optical fiber, and the ratio of the terminal end width of the branched optical waveguide (the horizontal length in the direction indicated as Y—Y in FIG. 4) to the core diameter of the optical fiber were both 0.8.

Next, sixteen (16) strands of GI fibers, 50 μm in core diameter and 125 μm in clad diameter, from which the coating had been removed, were arrayed on a glass substrate. In this way, two optical fiber arrays were manufactured so as to array and construct the clads in close contact with each other at their ends, and the end faces of the optical fiber arrays were polished.

A 16×16 branched optical star coupler was manufactured by placing the above optical fiber arrays at both ends of the above optical circuit, and by gluing the optical circuit to the optical fibers while setting their optical axes at the same position.

An LED light source with a 0.85 μm wavelength (made by ANDO ELECTRIC CO., LTD., AQ-1304 type) and an optical power meter (made by ANDO ELECTRIC CO., LTD., AQ-1111 type) were used to measure the insertion loss of the optical star coupler and to calculate the loss variance and the excess loss in a conventional way, thereby obtaining the results shown as marks o and □ in FIG. 6A, which shows the relationship between the ratio of the beginning end width to the terminal end width of the branched optical waveguide, i.e., the taper ratio, loss variance and excess loss.

EXAMPLES 4, 5, AND 6

A quartz photomask, on which an optical circuit pattern was formed with the dimensions shown in Chart 1, was made in order to manufacture a 32×32 branched optical star coupler to be connected to GI Optical fibers, each of which was 50 μm in core diameter and 125 μm in clad diameter. The spaces between the terminal ends of the branched optical waveguides were the same as in EXAMPLE 1, and the circumferences of the cores and clads of the branched optical waveguides were designed in the same manner as in EXAMPLE 1.

An optical circuit, of which the numerical aperture was 0.3 and which was 40 μm thick, was manufactured in the same manner as in EXAMPLE 1 by using the above photomask. Two optical fiber arrays, separately made by arraying thirty-two (32) optical fiber strands on glass substrates, were connected to the optical circuit in the same manner as in EXAMPLE 1 in order to manufacture a 32×32 optical star coupler. The insertion loss was measured, and loss variance and excess loss were calculated in the same manner as in EXAMPLE 1, thereby obtaining the results shown as marks o and □ in FIG. 6B, which shows the relationship between the taper ratio, loss variance and excess loss.

EXAMPLES 7, 8 AND 9

A quartz photomask, on which an optical circuit pattern was formed with the dimensions shown in Chart 1, was made in order to manufacture a 16×16 optical star coupler for GI optical fibers, each of which was 50 μm in core diameter and 125 μm in clad diameter. The spaces between the terminal ends of the branched optical waveguides were designed in the same manner as in EXAMPLE 1, and the method of forming the branched optical waveguides was the same as in EXAMPLE 1.

An optical circuit of which the numerical aperture was 0.3 and which was 40 μm thick was manufactured in the same manner as in EXAMPLE 1, and a 16×16 optical star coupler having the above optical circuit was manufactured. The loss variance and the excess loss were calculated from the insertion loss of the 16×16 branched optical star coupler, measured in the same manner as in EXAMPLE 1, thereby obtaining the results shown as marks o and □ in FIG. 7A, which shows the relationship between the ratio of length to width of the main optical waveguide, loss variance and excess loss.

EXAMPLE 10

A quartz photomask, on which an optical circuit pattern was formed with the dimensions shown in Chart 1, was made in order to manufacture a 32×32 optical star coupler for GI optical fibers, each of which was 50 μm in core diameter and 125 μm in clad diameter. The spaces between the terminal ends of the branched optical waveguides were designed in the same manner as in EXAMPLE 4, and the method of forming the branched optical waveguides was the same as in EXAMPLE 4.

An optical circuit of which the numerical aperture was 0.3 and which was 40 μm thick was manufactured in the same manner as in EXAMPLE 4, and a 32×32 optical star coupler with the above optical circuit was manufactured. Then, the insertion loss was measured, and the loss variance and the excess loss were calculated. The results shown as marks o and □ in FIG. 7B, show the relationship between the ratio of length to width of the main optical waveguide, loss variance and excess loss, and were obtained from EXAMPLES 5 and 10.

Chart 1

|  | Branched Optical Waveguide | | | | | Main Optical Waveguide | | |
| --- | --- | --- | --- | --- | --- | --- | --- | --- |
|  | A | B | M | X | Y | T | W | Z | W/Z |
| Ex. 1 | 16 | 36 | 12000 | 17 | 42 | 0.4 | 11500 | 272 | 42 |
| Ex. 2 | 16 | 41 | 12000 | 25 | 42 | 0.6 | 16600 | 400 | 41 |
| Ex. 3 | 16 | 46 | 12000 | 34 | 42 | 0.8 | 22400 | 544 | 41 |
| Ex. 4 | 32 | 57 | 17000 | 17 | 42 | 0.4 | 22300 | 544 | 41 |
| Ex. 5 | 32 | 67 | 17000 | 25 | 42 | 0.6 | 33000 | 800 | 41 |
| Ex. 6 | 32 | 79 | 17000 | 34 | 42 | 0.8 | 44600 | 1088 | 41 |
| Ex. 7 | 16 | 40 | 12000 | 25 | 42 | 0.6 | 16000 | 400 | 40 |
| Ex. 8 | 16 | 64 | 12000 | 25 | 42 | 0.6 | 40000 | 400 | 100 |
| Ex. 9 | 16 | 76 | 12000 | 25 | 42 | 0.6 | 52000 | 400 | 130 |
| Ex. 10 | 32 | 83 | 17000 | 25 | 42 | 0.6 | 48800 | 800 | 61 |

[Notes]
Ex: Example
A: Number of branches
B: Total length (mm)
M: Length of the branched optical waveguide (μm)
X: Width of the beginning end of the branched optical waveguide (μm)
Y: Width of the terminal end of the branched optical waveguide (μm)
T: Taper ratio
W: Length of the main optical waveguide (μm)
Z: Width of the main optical waveguide (μm)

EXAMPLES 11, 12, 13 AND 14

A quartz photomask, on which an optical circuit pattern was formed with the dimensions shown in Chart 2, was made in order to manufacture a 16×16 optical star coupler for GI optical fibers, each of which was 50 μm in core diameter and 125 μm in clad diameter. The spaces between the terminal ends of the branched optical waveguides were designed in the same manner as in EXAMPLE 1, and the method of forming the branched optical waveguides was the same as in EXAMPLE 1.

An optical circuit of which the numerical aperture was 0.3 and which was 40 μm thick was manufactured in the same manner as in EXAMPLE 1, and a 16×16 optical star coupler with the above optical circuit was manufactured. Then, the insertion loss was measured, and the loss variance and the excess loss were calculated, thereby obtaining the results shown as marks ● and ■ in FIG. 6A, which shows the relationship between the taper ratio, loss variance and excess loss.

EXAMPLES 15, 16, 17 AND 18

A quartz photomask, on which an optical circuit pattern was formed with the dimensions shown in Chart 2, was made in order to manufacture a 32×32 optical star coupler for GI optical fibers, each of which was 50 μm in core diameter and 125 μm in clad diameter. The spaces between the terminal ends of the branched optical waveguides were designed in the same manner as in EXAMPLE 4, and the method of forming the branched optical waveguides was the same as in EXAMPLE 4.

An optical circuit of which the numerical aperture was 0.3 and which was 40 μm thick was manufactured in the same manner as in EXAMPLE 4, and a 32×32 optical star coupler having the above optical circuit was manufactured. The insertion loss was measured, and the loss variance and the excess loss were calculated in the same manner as in EXAMPLE 4, thereby obtaining the results shown as marks ● and ■ in FIG. 6B, which shows the relation between the taper ratio, loss variance and excess loss.

EXAMPLES 19, 20 AND 21

A quartz photomask, on which an optical circuit pattern was formed with the dimensions shown in Chart 2, was made in order to manufacture a 16×16 optical star coupler for GI optical fibers, each of which was 50 μm in core diameter and 125 μm in clad diameter. The spaces between the terminal ends of the branched optical waveguides were designed in the same manner as in EXAMPLE 1, and the method of forming the branched optical waveguides was the same as in EXAMPLE 1.

An optical circuit of which the numerical aperture was 0.3 and which was 40 μm thick was manufactured in the same manner as in EXAMPLE 1, and a 16×16 optical star coupler having the above optical circuit was manufactured. The insertion loss was measured, and the loss variance and the excess loss were calculated, thereby obtaining the results shown as marks ● and ■ in FIG. 7A, which shows the relation between the ratio of length to width of the main optical waveguide, loss variance and excess loss.

EXAMPLES 22, 23 AND 24

A quartz photomask, on which an optical circuit pattern was formed with the dimensions shown in Chart 2, was made in order to manufacture a 32×32 optical star coupler for GI optical fibers, each of which was 50 μm in core diameter and 125 μm in clad diameter. The spaces between the terminal ends of the branched optical waveguides were designed in the same manner as in EXAMPLE 4, and the method of forming the branched optical waveguides was the same as in EXAMPLE 4.

An optical circuit of which the numerical aperture was 0.3 and which was 40 μm thick was manufactured in the same manner as in EXAMPLE 4, and a 32×32 optical star coupler having the above optical circuit was manufactured. The insertion loss was measured, and the loss variance and the excess loss were calculated, thereby obtaining the results shown as marks ● and ■ in FIG. 7B, which shows the relation between the ratio of length to width of the main optical waveguide, loss variance and excess loss,

Comparative Example 1

A quartz photomask, on which an optical circuit pattern with the same width at both the beginning ends and terminal ends of the branched optical waveguides was formed with the dimensions shown in Chart 2, was made in order to manufacture a 32×32 optical star coupler for GI optical fibers, each of which was 50 μm in core diameter and 125 μm in clad diameter. The spaces between the terminal ends of the branched optical waveguides were designed in the same manner as in EXAMPLE 1, and the method of forming the branched optical waveguides was the same as in EXAMPLE 1.

An optical circuit of which the numerical aperture was 0.3 and which was 40 μm thick was manufactured, and a 32×32 optical star coupler having the above optical circuit was manufactured. The insertion loss was measured in the same manner as in EXAMPLE 5, thereby obtaining the results shown as mark ● in FIG. 9 regarding loss variance at different ports.

Chart 2

|  | Branched Optical Waveguide | | | | | Main Optical Waveguide | | |
| --- | --- | --- | --- | --- | --- | --- | --- | --- |
|  | A | B | M | X | Y | T | W | Z | W/Z |
| Ex 11 | 16 | 29 | 12000 | 8 | 42 | 0.2 | 5200 | 128 | 40 |
| Ex 12 | 16 | 33 | 12000 | 13 | 42 | 0.3 | 8300 | 208 | 40 |
| Ex 13 | 16 | 48 | 12000 | 38 | 42 | 0.9 | 24300 | 608 | 40 |
| Ex 14 | 16 | 51 | 12000 | 42 | 42 | 1.0 | 26900 | 672 | 40 |
| Ex 15 | 32 | 44 | 17000 | 8 | 42 | 0.2 | 10200 | 256 | 40 |
| Ex 16 | 32 | 51 | 17000 | 13 | 42 | 0.3 | 16600 | 416 | 40 |
| Ex 17 | 32 | 83 | 17000 | 38 | 42 | 0.9 | 48600 | 1216 | 40 |
| Ex 18 | 32 | 88 | 17000 | 42 | 42 | 1.0 | 53800 | 1344 | 40 |
| Ex 19 | 16 | 28 | 12000 | 25 | 42 | 0.6 | 4000 | 400 | 10 |
| Ex 20 | 16 | 36 | 12000 | 25 | 42 | 0.6 | 12000 | 400 | 30 |
| Ex 21 | 16 | 86 | 12000 | 25 | 42 | 0.6 | 62000 | 400 | 155 |
| Ex 22 | 32 | 42 | 17000 | 25 | 42 | 0.6 | 8000 | 800 | 10 |
| Ex 23 | 32 | 58 | 17000 | 25 | 42 | 0.6 | 24000 | 800 | 30 |
| Ex 24 | 32 | 97 | 17000 | 25 | 42 | 0.6 | 62400 | 800 | 78 |
| CE 1 | 32 | 55 | 17000 | 42 | 42 | 1.0 | 20600 | 1344 | 15 |

[Notes]
Ex: Example
CE: Comparative Example
A: Number of branches
B: Total length (mm)
M: Length of the branched optical waveguide (μm)
X: Width of the beginning end of the branched optical waveguide (μm)
Y: Width of the terminal end of the branched optical waveguide (μm)
T: Taper ratio
W: Length of the main optical waveguide (μm)
Z: Width of the main optical waveguide (μm)

In the 32×32 branched optical star coupler constructed with a conventional optical circuit connected to 50/125 GI optical fibers, as the entering light enters from the ports and propagates toward the outside ports, polarization of light occurs and the distribution of light worsens. More particularly, in FIG. 8, when comparing the light entering the ports in the center portion, for example, ports nos. 12 to 20, with the light entering the ports in the outermost positions, nos. 1 and 32, there is a substantial difference in the loss variance, measured at 18 dB. The reason for this difference is that the light entering the outside ports is extremely likely to be distributed to the opposite outside ports and the adjacent ports on the light ejecting side.

Figure 9:
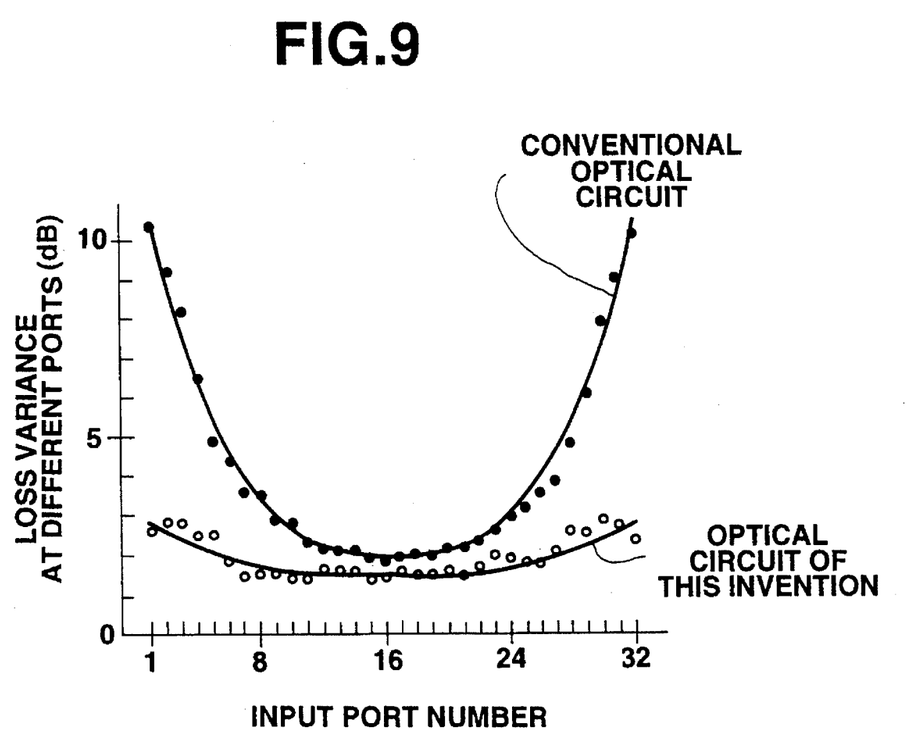
FIG. 9 is a diagram comparing the 32×32 optical star coupler of the present invention and the conventional 32×32 optical star coupler regarding the loss variance at different ports.

On the contrary, in the optical star coupler corresponding to the one indicated as o in FIG. 9, the loss variance is substantially constant from outside ports to the center portion, and the light entering the main optical waveguide from outside ports is equally distributed to the ports on the light ejecting side.

In the present invention, an optical device with optical waveguides, i.e., a multiple branched multi-mode type optical star coupler, with good loss variance, or not only with good loss variance but also little excess loss, can be produced. Moreover, it is possible to manufacture and supply such optical circuits at high yield. Implementation of the present invention makes the supply of high perfomance, inexpensive waveguide type multi-mode multiple branched optical star couplers to the market possible, enhancing the reliability of multi-mode optical networks (LAN), and makes construction of inexpensive systems with the intention of wide distribution possible.

What is claimed is:

1. An optical device having an optical transmission means which mixes a plurality of entering light signals, and then distributes and ejects the mixed light signals; said optical transmission means comprising:

an optical circuit in which a plurality of branched optical waveguides are connected to a light receiving side and a light ejecting side of a main optical waveguide, which mixes the entering light, wherein said optical circuit has the following characteristics:

$X/Y \leq 0.8$ $40 \cdot Z \leq W$

X: Width of said branched optical waveguide at its joint portion with said main optical waveguide,
Y: Width of said branched waveguide at its end on the terminal side,
W: Longitudinal length of the main optical waveguide (mm), and
Z: Cross-directional length of the main optical waveguide (mm), wherein at least one of said branched optical waveguides has a slope of which a width is wider at its end on a terminal side than at its end on a side to be connected to the main optical waveguide and at least one of saint branched optical waveguides comprises a bend with points of inflection.

2. An optical device according to claim 1, wherein said optical circuit has the following further characteristics:

$0.4 \leq X/Y$ $W < 60$ mm.

3. An optical device according to claim 1, wherein the terminal end of said branched optical waveguide has a width corresponding to 70% to 100% of a core diameter of an optical fiber, said optical fiber being connected to said terminal end.

4. An optical device according to claim 1, wherein a radius of curvature of said bend is set at a point from which a bend loss begins to increase radically.

5. An optical device according to claim 2, wherein said characteristics are adjusted for each branched optical waveguide in order to correct differences in loss due to different lengths of said branched optical waveguides.

6. An optical device according to claim 1, wherein said at least one branched optical waveguide comprises two circular arc shaped optical transmission paths each having a radius and a center, and of which the radii are almost the same in length, the centers of which are located in opposite positions, and which are connected to each other.

7. An optical device according to claim 1, wherein said main optical waveguide and said branched optical waveguides have a larger numerical aperture than that of outside optical fibers to be connected to the terminal ends of the branched optical waveguides.

8. An optical device according to claim 1, further comprising an optical fiber to be connected to the branched optical waveguides.

9. An optical network, comprising:

an optical device which mixes a plurality of entering light signals and then distributes and ejects the mixed light signals, said optical device having an optical circuit in which a plurality of branched optical waveguides are connected to a light receiving side and a light ejecting side of a main optical waveguide, which mixes the entering light, wherein said optical circuit has the following characteristics:

$X/Y \leq 0.8$ $40 \cdot Z \leq W$

X: Width of said branched optical waveguide at its joint portion with said main optical waveguide, Y: Width of said branched optical waveguide at its end on the terminal side, W: Longitudinal length of the main optical waveguide (mm), and Z: Cross-directional length of the main optical waveguide (mm); and optical fibers connected to said branched optical waveguides, wherein at least one of said branched optical waveguides has a slope of which a width is wider at its end on a terminal side than at its end on a side to be connected to the main optical waveguide and at least one of said branched optical waveguides comprises a bend with points of inflection.

10. An optical network according to claim 9, wherein said optical circuit has the following characteristics:

$$0.4 \leq X/Y$$

$$W < 60 \text{ mm.}$$

11. An optical network according to claim 9, wherein said optical fiber comprises a graded multi-mode type optical fiber.

12. An optical network according to claim 11, wherein said graded multi-mode type optical fiber is 50 microns in core diameter and 125 microns in clad diameter.

13. An optical network according to claim 11, wherein the terminal end of said branched optical waveguide has a width corresponding to 70% to 100% of the core diameter of an optical fiber, said optical fiber being connected to said terminal end.

14. An optical network according to claim 9, wherein a radius of curvature of said bend is settled at a point from which a bend loss begins to increase radically.

15. An optical network according to claim 10, wherein said characteristics are adjusted for each branched optical waveguide in order to correct the differences in loss due to different lengths of said branched optical waveguides.

16. An optical network according to claim 11, wherein said main optical waveguide and said branched optical waveguides have a larger numerical aperture than those of the optical fibers to be connected to the terminal ends of the branched optical waveguides.

17. An optical network according to claim 9, wherein said branched optical waveguide comprises two circular arc shaped optical transmission paths each having a radius and a center, and of which the radii are almost the same in length, the centers of which are located in opposite positions, and which are connected to each other.

18. A method of manufacturing an optical circuit, comprising the steps of:

selectively irradiating light on a base material containing light reactive monomers; and forming an optical circuit in which a plurality of branched optical waveguides are connected respectively to a light receiving side and a light ejecting side of a main optical waveguide, which mixes an entering light, wherein said optical circuit is constructed so as to have the following characteristics, $$X/Y \leq 0.8$$

$$40 \cdot Z \leq W$$

X: Width of said branched optical waveguide at its joint portion to the main optical waveguide, Y: Width of said branched optical waveguide at its end on the terminal side, W: Longitudinal length of the main optical waveguide, and Z: Cross directional length of the main optical waveguide, wherein at least one of said branched optical waveguides is formed to have a slope of which a width becomes wider at its end on a terminal side than at its end on a side to be connected to the main optical waveguide and at least one of said branched optical waveguides comprises a bend with points of inflection.

19. A method of manufacturing the optical circuit according to claim 18, wherein said optical circuit is constructed to have the following further characteristics:

$$0.4 \leq X/Y$$

$$W < 60 \text{ (mm).}$$

20. An optical circuit according to claim 18, wherein said base material contains polycarbonate, and said monomers contain at least one of acrylic acid and acrylate.

* * * * *